United States Patent [19]

Strauss

[11] Patent Number: 4,826,463
[45] Date of Patent: May 2, 1989

[54] SEALING FOR CRT COMPONENTS

[75] Inventor: Paul Strauss, Chicago, Ill.

[73] Assignee: Zenith Electronics Corporation, Glenview, Ill.

[21] Appl. No.: 139,526

[22] Filed: Dec. 30, 1987

Related U.S. Application Data

[62] Division of Ser. No. 933,646, Nov. 21, 1986, Pat. No. 4,788,471.

[51] Int. Cl.[4] .............................................. H01J 9/26
[52] U.S. Cl. .......................................... 445/45; 65/43
[58] Field of Search .............. 445/44, 45; 65/43; 313/402

[56] References Cited

U.S. PATENT DOCUMENTS

| | | | |
|---|---|---|---|
| Re. 25,791 | 6/1965 | Claypoule | 65/43 X |
| 2,629,093 | 2/1953 | Pask et al. | 65/43 X |
| 2,837,235 | 6/1958 | Vincent | 65/43 X |
| 2,936,923 | 5/1960 | Veres | 65/43 X |
| 3,291,587 | 12/1966 | Loehrke | 65/43 |
| 3,589,881 | 6/1971 | Langley et al. | 65/43 X |
| 4,593,225 | 6/1986 | Dietch et al. | 313/402 X |

FOREIGN PATENT DOCUMENTS 1477706  3/1967  France ................... 445/45

Primary Examiner—Kenneth J. Ramsey

[57] ABSTRACT

Improved bonding in a cathode ray tube (CRT) between its glass funnel and glass faceplate is achieved by applying a thin base layer of a priming agent to an aft portion of the faceplate adjacent to the periphery thereof as well as to the forward edge of the funnel prior to positioning of the CRT components in contact. An intermediate layer of sealing glass frit is then deposited upon either of the aforementioned layers of the priming agent and adheres to the two priming agent layers without forming a re-entrant geometry. By "priming" the two abutting glass surfaces over an area which extends beyond the area of high loading with the priming agent prior to joining these surfaces, bond integrity is ensured and high stress concentration in the seal is avoided. The sealing glass frit may be comprised of a conventional glass cement paste and is also used as the priming agent in a preferred embodiment. The improved bonding method may also be used to bond a shadow mask support structure to the faceplate's inner surface or other CRT components to each other. Improved CRT components and assemblies made by the disclosed method are also disclosed.

19 Claims, 3 Drawing Sheets

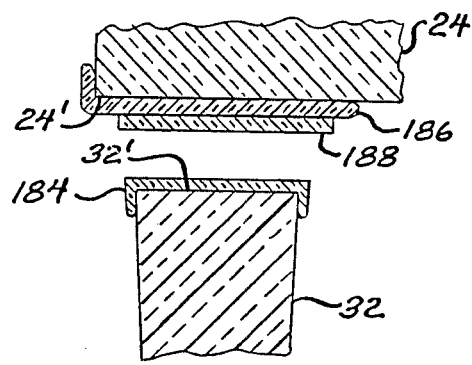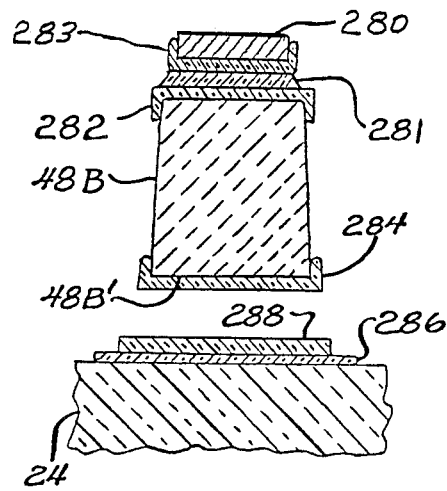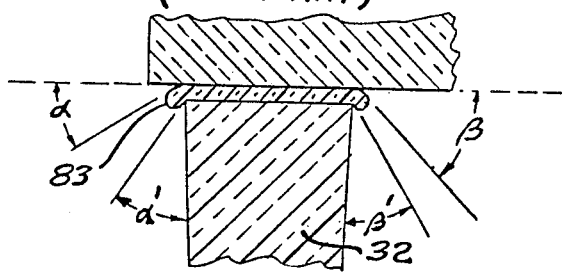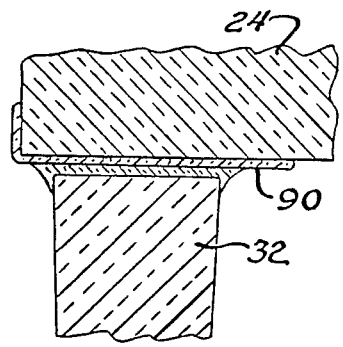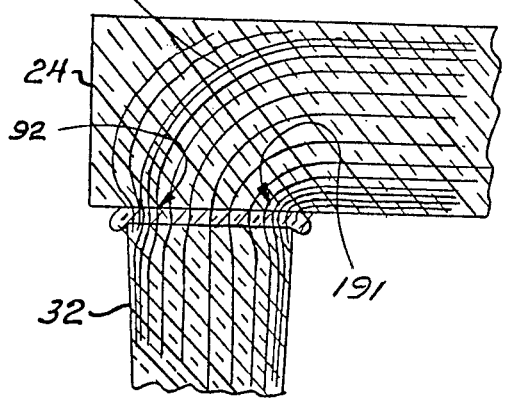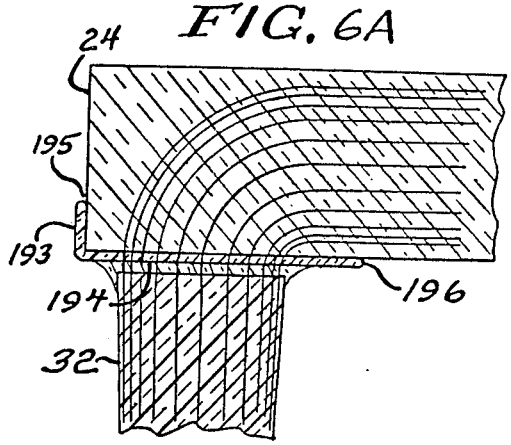

SEALING FOR CRT COMPONENTS

This application is a division of application Ser. No. 933,646, filed Nov. 21, 1986, now U.S. Pat. No. 4,788,471.

CROSS-REFERENCE TO RELATED APPLICATION

This application is related to, but in no way dependent upon, the following copending application, assigned to the assignee of the present application: Ser. No. 866,030, filed May 21, 1986, now U.S. Pat. No. 4,737,681, and Ser. No. 947,732, filed Dec. 30, 1986.

BACKGROUND OF THE INVENTION

This invention relates generally to cathode ray tubes (CRTs) and display devices and is particularly directed to improving the sealed coupling between the faceplate and the funnel of a CRT or between other CRT components, e.g., between a shadow mask supporting structure and the CRT's faceplate.

In the final assembly of the envelope of a CRT, a frit material, typically a suspension of thermal setting sealing glass paste, is deposited upon one of the abutting surfaces of the faceplate or funnel, generally the forward edge of the funnel, prior to positioning of the faceplate and funnel in intimate contact. The faceplate and funnel combination is then heated to the melting temperature of the sealing glass frit which then flows so as to cover and join abutting surfaces of the faceplate and envelope. The sealing glass frit is heated to a temperature so as to effect its devitrification whereupon at least a part of the frit is converted, or devitrified, to a crystalline phase, or a rigid crystalline skeleton. The crystalline phase of the frit is characterized by a glassy matrix wherein the thermal and other material characteristics such as viscosity and coefficient of expansion differ from those of the original sealing glass frit and are substantially determined by the crystalline phase. The melting point temperature of the devitrified sealing glass frit is lower than the fiber softening point temperature of the glass components to allow for bakeout operation of the CRT whereupon organic vapors are volatilized or vaporized and removed from the CRT.

The cohesive nature and high surface tension of the ealing glass frit results in the formation of "re-entrancies", giving rise to stress concentrations in the faceplate-funnel seal resulting in potential weakening of this joint. Breakdown of this seal results in failure of the CRT and requires its replacement. When this occurs during CRT manufacture the tube is scrapped and an attempt is made to salvage any usable components and materials within the CRT.

The occurrence of such re-entrant seals in the manufacture of cathode ray tube envelopes is a serious problem causing a significant reduction in tube yields (percentage of acceptable tubes) in the factory. Defects introduced in the final stages of tube fabrication are especially costly, as the value of the assembly-in-process is approaching then its maximum. The problem of re-entrant seals has eluded solution by practitioners for decades in spite of a universal recognition of its huge cost to tube manufacturers.

The recent development of CRTs having a substantially flat faceplate and incorporating a shadow mask of the tensioned foil type has placed increasing demands upon the seal between the faceplate and funnel. For example, flat faceplate CRTs exhibit greater stress in the sealing area than conventional CRTs incorporating a curved faceplate having a rearward flange to facilitate its coupling to a funnel. In order to minimize stresses in the seal area accompanying bulb flexure under thermal processing and evacuation, these CRTS exhibit wider seal areas at the funnel. In addition, the panel is made to overhang the funnel in order to minimize the possibility of severe re-entrancies in the funnel-to-panel seal interface which can occur if the funnel exterior and panel edge are nearly "line-to-line." This latter situation can occur in bulb assembly fixturing as the result of glass dimensional tolerances. The consequence of these accommodations is to increase the overall footprint size of the panel and the weight of the tube. In addition, the foil mask requires a mounting structure which, under the load of the tensed mask, induces stresses at its bonded interface with the bulb envelope.

The response of the various CRT components to the stresses described above includes elastic deformations due to vacuum and tension mask loads as well as thermal deformations occurring during CRT processing. The thermal responses include "differential" deformations accompanying thermal gradients during CRT processing as well as responses of joined CRT components having different coefficients of thermal expansion. The internal load patterns which accompany the deformations result in load paths which pass through the component junctures.

The internal load pattern within the CRT gives rise to internal stresses, with the load path through adjacent component junctures producing stresses in the sealing glass frit which forms the structural joint. If the joint ehibits a re-entrant geometry, stress concentrations due to this geometry will occur in the joint, increasing the possibility of structural failure. This is of particular concern in the case of flat panel CRTs which undergo high panel-to-funnel interface stresses than conventional domed face, skirted panel CRTs. The sealing glass frit is highly cohesive and does not readily wet glass. Consequently, in the prior assembly of CRT components, the sealing glass frit used in forming the joint tends to roll back upon itself and re-entrancies are formed.

The present invention addresses the aforementioned problems of the prior art by providing improved sealing for a CRT faceplate mounted to the forward edge portion of the CRT's funnel. The present invention, which is applicable to CRTs having a flat faceplate as well as to those incorporating a curved faceplate, compensates for the cohesive nature of the sealing glass frit used to couple the CRT's faceplate and funnel and minimizes stress concentrations in the connections between various structures in the CRT.

Related problems arise in other structural bonds including glass-to-ceramic, glass-to-metal, metal-to-ceramic, or related composition in the manufacture of CRTs and these problems, too, are addressed by this invention.

OBJECTS OF THE INVENTION

Accordingly, it is an object of the present invention to provide an improved sealing connection between the faceplate and funnel of a CRT.

It is another object of the present invention to provide for improved coupling to and mounting of a mask support upon the glass faceplate of a CRT.

Yet another object of the present invention is to provide improved frit-bonding between the faceplate and funnel or between other components of a CRT.

A still further object of the present invention is to minimize stress concentration within the bond between two joined glass, ceramic, glass-ceramic, glass-metal, ceramic-metal structures, or structures having other compositions, joined by a frit cement.

A still further object of the present invention is to provide more reliable assembly of a CRT.

Another object of the present invention is to provide a method and arrangement for securely mounting a faceplate on a CRT funnel which is particularly adapted for use in the assembly of CRTs having a generally flat faceplate.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in connunction with the accompanying drawings, wherein like reference characters identify like elements throughout the various figures, in which:

FIG. 3 illustrates details of the faceplate and funnel sealing area and the manner in which a sealing glass frit is applied thereto in accordance with the present invention;

FIG. 4 is an exploded sectional view of the sealing area of a faceplate and a support structure for a flat tension mask in a CRT illustrating the manner in which a sealing glass frit is applied thereto in accordance with the present invention;

FIG. 5 illustrates the sealing connection between the faceplate and funnel of a CRT encountered in the prior art;

FIG. 5A illustrates the location of stress concentrations caused by re-entrant seals present in faceplate-funnel joints formed in accordance with prior art approaches;

FIG. 6 illustrates the formation and configuration of the sealed connection between the faceplate and funnel of a CRT in accordance with the present invention;

FIG. 6A illustrates the absence of stress concentrations in a faceplate-funnel joint formed with a single sealing glass frit priming layer in accordance with the present invention.

DETAILED DESCRIPTION OF THE PREFERRED EMBODIMENT

Figure 1:
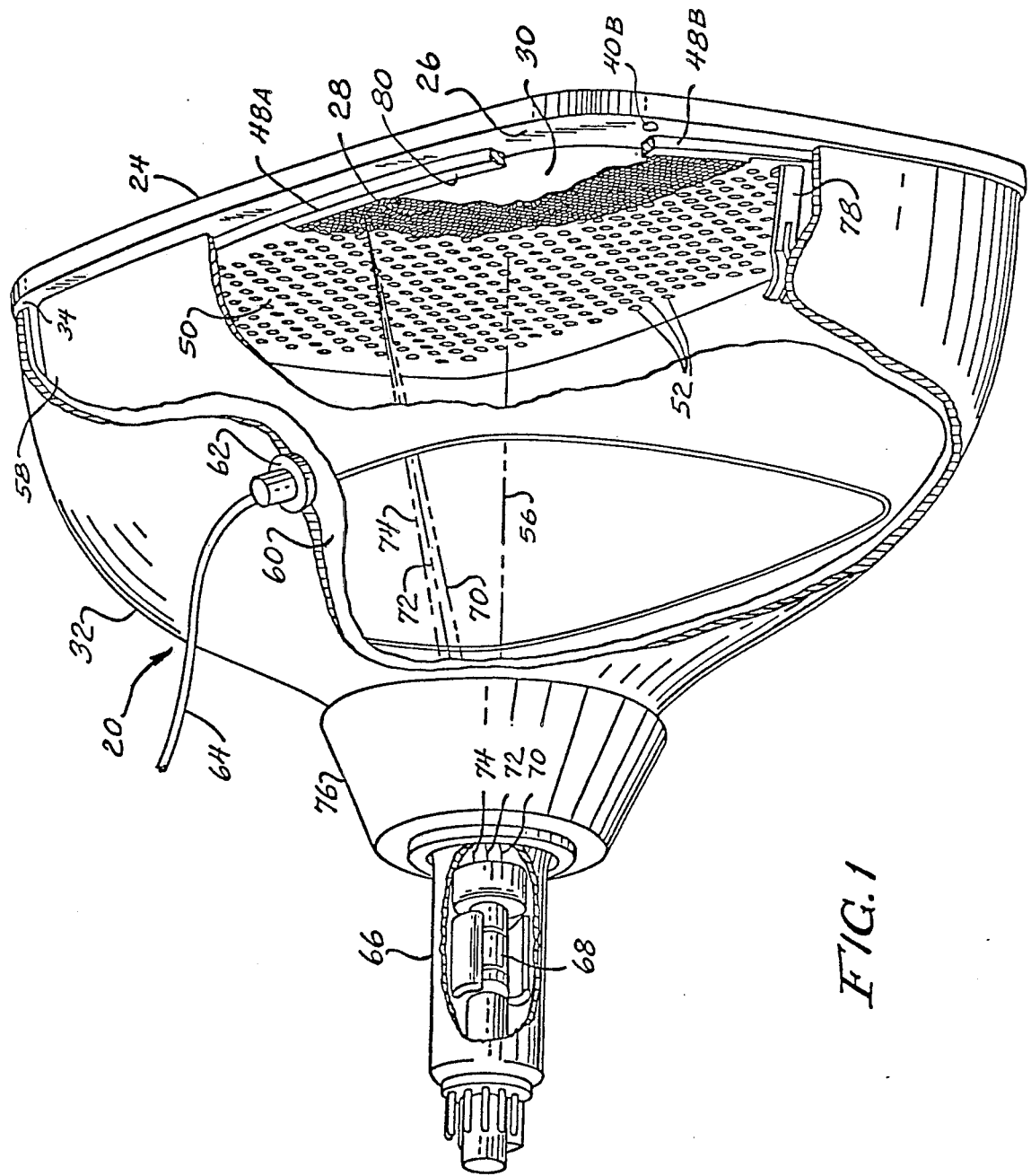
FIG. 1 is a partially cutaway perspective view of a color CRT of the flat faceplate type having a shadow mask under high tension.

Referring to FIG. 1, there is shown a partially cutaway perspective view of a color CRT 20 with which the improved sealing method of the present invention is intended for use.

The color CRT 20 includes a flat faceplate 24 positioned upon and securely mounted to the forward edge portion of a funnel 32. The flat faceplate 24 and the funnel 32 are comprised of glass, with the enclosed structure thus formed evacuated by conventional means (not shown) after various electronic components are positioned therein and the structure is then sealed. Positioned within the neck portion 66 of the funnel 32 is an in-line electron gun 68 which is aligned with the anterior-posterior axis of the CRT designated by the numeral 56. The in-line electron gun 68 emits a plurality of electron beams 70, 72 and 74 which are directed through apertures 52 in a metal foil shadow mask 50 which is maintained under high tension and is closely spaced relative to the inner surface 26 of the faceplate 24. A magnetic deflection yoke 76 is positioned about the funnel's neck 66. Horizontal and vertical deflection currents are provided to the magnetic deflection yoke 76 for deflecting the three electron beams in a timed manner across the CRT's faceplate 24.

Figure 2:
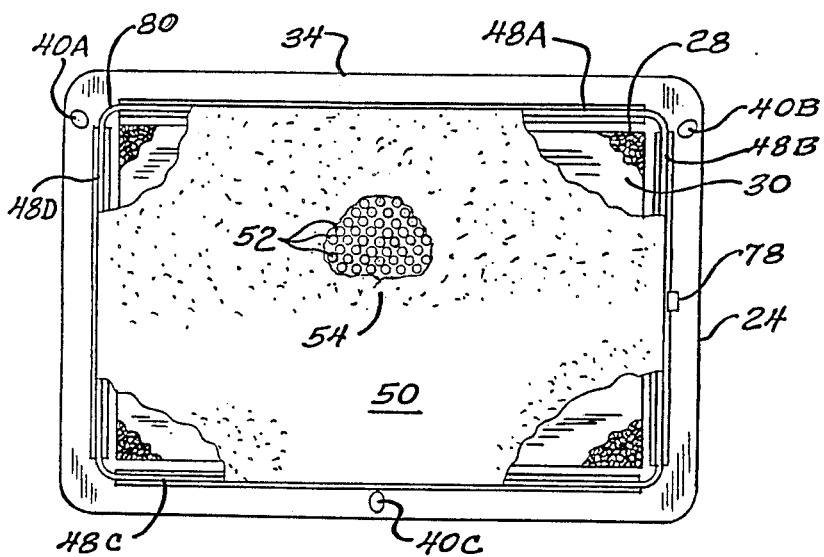
FIG. 2 is a partially cutaway plan view of the CRT of FIG. 1 showing details of the manner in which the shadow mask is mounted upon the CRT's faceplate.

A high voltage electron accelerating potential is applied from a power supply (not shown) via a conductor 64 to an anode button 62 on the CRT's funnel. The anode button 62 extends through the CRT's funnel 32 and is in electrical contact with an internal conductive coating 60 on the inner surface of the funnel 32. A contact spring 78 is electrically coupled to the internal conductive coating 60 and is further coupled to the metal foil shadow mask 50 such as by means of a weldment. Electrical contact is also established between the metal foil shadow mask 50 and a metal cap 80 on each of four rails 48A–48D which are used for mounting and positioning the metal foil shadow mask within the CRT as illustrated in FIG. 2 and is described in detail below. Disposed on the inner surface of the CRT's glass faceplate 24 is a film of reflective and electrically conductive aluminum 30. Mounted to the faceplate and positioned between the reflective and conductive aluminum film 30 and the flat tension shadow mask 50 is phosphor screen 28 responsive to electrons incident thereon for emitting light when excited by electrons emitted by the electron gun 68.

Referring to FIG. 2, there is shown a partially cutaway plan view of the CRT 20 of FIG. 1 illustrating details of the manner in which the shadow mask 50 is positioned upon and mounted to the CRT's faceplate 24. The manner in which the shadow mask 50 is positioned upon and mounted to the CRT's faceplate 24 as shown in FIGS. 1 and 2 is provided herein to set forth the environment in which the present invention is intended for use and does not represent a limitation of the present invention. Thus, the present invention may be used in sealing various structural arrangements between the faceplate and funnel and other components of a CRT. In addition, the sealing method of the present invention is not limited to use in flat tension mask CRTs having a flat faceplate, but may also be employed equally as well for coupling in a sealed manner a CRT funnel to a curved faceplate. Finally, as described below, the improved sealing method of the present invention may be used to couple a flat tension mask support structure to either a flat faceplate or to the CRT's funnel for those installations wherein a separate shadow mask support element is disposed between and coupled to the CRT's faceplate and funnel.

The arrangement for mounting the shadow mask illustrated in FIGS. 1 and 2, which is described and claimed in co-pending patent application Ser. No. 866,030, filed Nov. 21, 1986, and assigned to the assignee of the present application, includes a shadow mask support structure comprised of a ceramic material and including four discrete rails 48A–D, with rails 48A and 48C positioned respectively on the upper and lower portions of the faceplate 24, and rails 48B and 48D respectively positioned on the right and left lateral edge portions of the inner surface of the faceplate. Each of the rails is secured to the inner surface 26 of the faceplate 24 on opposite sides of the phosphor screen 28, between a sealing area 34 and the phosphor screen for receiving and supporting the foil shadow mask 50 in tension a predetermined distance from the phosphor screen. The shadow mask support structure 48 includes means for interconnecting the rails 48A-D to form a generally rectangular, unitary shadown mask support structure. In one embodiment, each of the rails is connected to two adjacent rails by means of a continuous weldable metal strip 80 attached to the upper edge of each of the rails for securing the shadow mask 50 by weldments to its support structure. The metal strip 80 may be fastened to the upper edge of each of the ceramic rails 48A-D by means of a suitable cement. As shown in FIG. 2, the metal strip 80 interconnects adjacent rails near the respective ends thereof. With the metal strip 80 thus securely attached to each of the rails 48A-D along the respective lengths thereof and with the foil shadow mask 50 welded to the metal strip, the foil shadow mask may be maintained in a stretched manner under high tension in position adjacent to the phosphor screen 28 on the rear surface of the faceplate 24. The present invention relates to the manner in which the funnel 32 is mounted in a sealed manner to the aft, peripheral edge portion of the faceplate 24 and also to the manner in which the shadow mask support structure is securely mounted to the aft surface of the faceplate.

Referring to FIG. 3, there is shown the manner in which a funnel 32 is connected in a sealed manner in accordance with the principles of the present invention to a faceplate 24. As shown in FIG. 3, a first base or priming layer 184 of frit cement is positioned on the abutting edge portion 32' of the funnel 32, while a second base or priming layer 186 of frit cement is positioned on the faceing edge portion 24' of the faceplate 24. For reasons which will be explained below, it should be noted that both base frit cement layers 184 and 186 extend well beyond the area of contact between the faceplate 24 and funnel 32. This is accomplished by extending the width of the second base layer 186 well beyond the width of the funnel 32 and extending the first base layer 184 of frit cement over and beyond the corners of the abutting edge of the funnel. An intermediate layer of frit cement 188 is disposed between and in intimate contact with the first and second base layers of frit cement 184 and 186. The intermediate layer of frit cement 188 has a high wetting affinity for the first and second base layers of frit cement 184 and 186 and the strong adhesion between these frit cement layers forms a high strength bond between the faceplate 24 and the funnel 32. By thus distributing the base frit cement layers well beyond the area of contact between the faceplate 24 and the funnel 32 in establishing re-entrant free bond therebetween, the prior art requirement for providing the faceplate with a peripheral overhang about the funnel is eliminated.

Referring to FIG. 4, there is shown the manner in which a shadow mask support structure 48B may be bonded to the CRT's faceplate 24 in accordance with the present invention. A first base layer of frit cement 284 is disposed upon the abutting edge portion 48B' of the shadow mask support structure 48B. This first base layer of frit cement 284 is further extended along the facing lateral portions of the shadow mask support structure 48B so as to extend around the two facing corners of the support structure in order to prevent an intermediate layer of frit cement 288 from directly contacting the support structure. An intermediate layer of frit cement 288 is deposited upon a second base layer of frit cement 286 which extends well beyond the width of the abutting edge of the shadow mask support structure 48B. A frit cement arrangement including an intermediate layer of frit cement 281 and first and second base layers of frit cement 282 and 283 may also be used to securely mount a metal strip 280 on the upper edge portion of the shadow mask support rails 48B. Again, the large adhesive forces between the intermediate and base frit cement layers establishes a strong bond between the faceplate 24 and the shadow mask support structure 48B.

Referring to FIG. 5, there is shown the manner in which a prior art seal was formed using a single layer 83 of frit cement. Because of the cohesiveness and high surface tension of the frit cement and its very limited ability to wet, or adhere to, glass and ceramic materials such as the surfaces of the glass faceplate 24 and glass funnel 32, the frit cemenet tends to cohere to itself and form discontinuities in the seal with the abutting glass surfaces. For example, it can be seen that on the lefthand portion of the funnel 32 (in FIG. 5), the edge of the frit cement 83 has assumed the form of a bead resulting in the formation of an angle $\alpha$ between the plane of the faceplate 24 and the edge of the frit cement where it contacts the faceplate and $\alpha'$ between the plane of the funnel 32 and the edge of the frit cement where it contacts the funnel. Similarly, the right-hand edge of the frit cement 83 has formed a bead-like end portion which forms an angle $\beta$ with the surface of the faceplate 24 and angle $\beta'$ between the plane of the funnel 32 and the edge of the frit cement where it contacts the funnel. These angles are less than 90° and the resultant re-entrant interface geometry between the frit cement 83 and the surface of faceplate 24 functions as a stress concentrator and weakens the sealing engagement between the faceplate 24 and the funnel 32. Weakening of this seal substantially increases the possibility of CRT failure.

To better understand stress concentrations caused by the re-entrant seals formed according to prior art techniques, reference may be had to FIG. 5A. The internal load patterns which accompany deformations produced during bulb evacuation and thermal processing result in load paths which pass through the faceplate-funnel joint, as shown by the load path lines 190 in FIG. 5A. As shown in FIG. 5A, the load lines are denser toward the inside and outside surfaces of the funnel 32, indicating that the stresses on the faceplate-funnel joint are greater at the inside and outside edges of the joint than in the center of the joint. Thus the stresses are greatest in regions 191 and 192 where the re-entrant seals are formed.

Glass will fail in tension, but not in compression. Potentially damaging tensile fiber stresses are created to the exterior portion of the faceplate-funnel joint as a result of evacuation of the tube. During thermal processing of a CRT, as a result of uneven heating of the outer and inner faceplate surfaces, dynamic tensile stresses can be produced on the interior portion of the joint.

As noted above, due to the geometry of the re-entrant seals, enhanced concentrations of stresses will occur in regions of the re-entrancies, increasing the possibility of structural failure of the seal in those regions. This is of particular concern as regards flat panel CRTs which undergo higher panel-to-funnel interface stresses than conventional dome-faced, skirted panel tubes.

In accordance with this invention, a thin layer of priming compound, for example frit, is applied to the region of one, or preferably each, interface surface to be joined. The sealing frit which actually accomplishes the structural joint is applied in conventionl quantity to permit "settling" in conventional assembly techniques. The excess of the sealing frit which exudes from between the butting component interfaces wets and adheres to the priming layer without introducing the typical re-entrant geometry of the prior art assembly. As a result, the stresses arising in the structural joint are not subject to the concentrations which can occur with prior art assembly techniques. The extent of application of the thin priming layer is such that the layer does not terminate on a component in a region where the layer's own re-entrant geometry can cause an amplification of internal tensile fibre stresses of structurally significant magnitude. This generally implies that the priming layer extend outside of and beyond the region where the internal load path intensifies stresses at the juncture of the opposing components.

This is shown clearly in FIG. 6A which illustrates the simplest case of one priming layer only. In FIG. 6A, layer 193 is the base or priming layer and layer 194 is the sealing layer. Whereas it is true that the re-entrant geometry may occur at the terminations 195, 196 of the primary layer 193, in accordance with this invention the location of these terminations 195, 196 is deliberately placed outside the region of the joint in regions of low stresses within the bulb. As shown in FIG. 6A, in regions of the terminations 195 and 196 of the priming layer 193, the stresses are very low. In other words, whereas there may be stress concentrations in the regions 195, 196, the level of the stresses concentrated is so low as to cause no failure problem. Thus, the extent of application of the thin priming layer 193 is such that the layer does not terminate on a component in a region where the layer's own re-entrant geometry can cause an amplification of internal tensile fiber stresses of structurally significant magnitude. This generally implies that the priming layer extend "outside" of the region where the internal load paths intensify stresses at the juncture of opposing components.

The same principles as discussed above apply to the bonding of other components, for example, the bonding of a shadow mask frame to the inner surface of the faceplate, as described above.

Referring to FIG. 6, there is shown the configuration of a seal between the faceplate 24 and funnel 32 formed by using during CRT fabrication a plurality of base or priming layers in accordance with the present invention. As shown in the figure, the frit cement layers disposed upon and between the abutting surfaces of the faceplate 24 and funnel 32 coalesce in a geometry essentially free of re-entrancies. The arrangement of the non-re-entrant frit layer 90 in FIG. 6 represents a substantially stronger bond configuration between the faceplate 24 and funnel 32 than the prior art configuration of the frit layer 83 illustrated in FIG. 5. In addition, a bond formed in accordance with the present invention does not include the bead-like end portions encountered in the prior art and is thus not subjected to re-entrancies as are prior art sealing approaches.

The base frit layers may be applied to the abutting surfaces of the faceplate, funnel, or tension mask support structure by dipping, rolling, spraying, wiping, silk screening, or other suitable technique.

Figure 7:
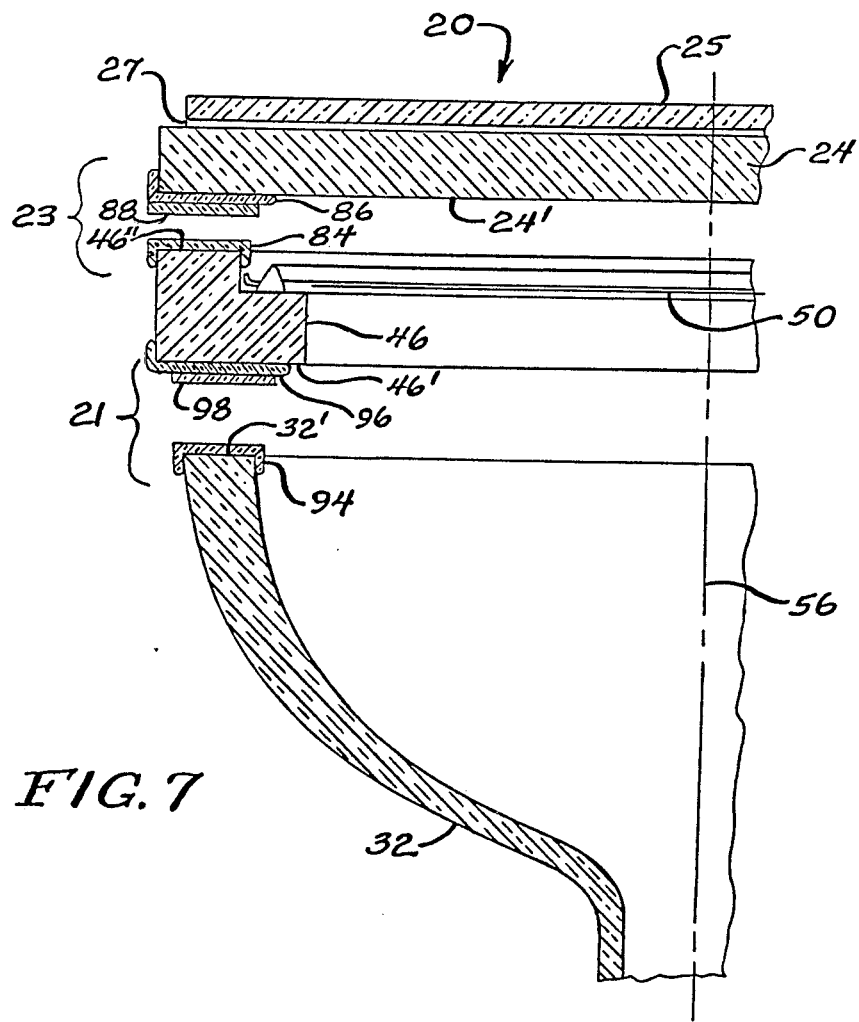
FIG. 7 is an exploded, partial, longitudinal cross-sectional view of one arrangement of a flat tensioned mask CRT in which the present invention has application.

Referring to FIG. 7, there is shown another flat tension mask CRT arrangement in which the sealing method of the present invention may be used. In the arrangement of FIG. 7, a shadow mask support structure 46 is disposed around the periphery of the foil shadow mask 50 and is coupled thereto for maintaining the shadow mask under high tension. In addition, the shadow mask support structure 46 is coupled to and disposed between the CRT's funnel 32 and the peripheral edge of its faceplate 24. Disposed on the front or outer surface of the faceplate 24 and maintained in position thereon by means of resin layer 27 is a glass panel 25. Again, the configuration of the flat tension mask CRT 20 illustrated in FIG. 7 does not represent a limitation of the sealing method of the present invention, but rather is intended to illustrate yet another CRT arrangement in which the present invention may be used in a first sealing area 21 to securely couple the funnel 32 to a first, rear edge of the shadow mask support structure 46 as well as in a second sealing area 23 to securely couple a forward edge portion of the shadow mask support structure to the rear, peripheral edge surface of the CRT's faceplate 24. The shadow mask support structure 46 is typically comprised of a ceramic or glass material to which is bonded the periphery of the metal foil shadow mask 50 such as by frit cement to maintain it in a stretched condition under high tension. Details of the structure of the CRT 20 illustrated in FIG. 7 as well as its implosion panel 25 and shadow mask support structure 46 may be found in co-pending application Ser. No. 947,732, filed Dec. 30, 1986, which is assigned to the assignee of the present application.

In accordance with the present invention, FIG. 7 further illustrates the manner in which an improved seal is provided between the funnel 32 and the shadow mask support structure 46 as well as between the shadow mask support structure and the CRT's faceplate 24. A first base layer or sealing glass frit 94 serves as a priming agent and is positioned upon and about the forward edge 32' of the funnel 32. Similarly, a second base layer of sealing glass frit 96 is positioned upon the aft surface 46' of the shadow mask support structure 46 and serves to pre-wet this surface. Finally, an intermediate layer of sealing glass frit 98 is positioned upon either the first or second base frit layers 94, 96 whereupon the forward edge 32' of the funnel 32 is positioned in intimate contact with the aft surface 46' of the shadow mask support structure 46 for effecting sealing engagement therebetween.

From the figure it can be seen that the first base frit layer 94 extends beyond the forward edge portion 32' of the funnel 32 and rearward on the facing lateral portions thereof. In addition, the intermediate frit layer 98 is shown as positioned upon and extending over only a portion of the length, or width, or the second base frit layer 96. In this manner, the first and second base frit layers 94, 96 serve to pre-wet the respective facing surfaces of the funnel 32 and shadow mask support structure 46 in order to compensate for the high cohesion of the sealing glass frit. It is important that both base frit layers extend well beyond the area of engagement of the two structures to be joined in order to prevent the intermediate layer of sealing glass frit 98 from contacting unprimed glass resulting in the occurrence of frit bead re-entrancies and consequent stress concentrations in areas of high internal stress patterns.

Also shown in FIG. 7 is the manner in which the forward surface 46" of the shadow mask support structure 46 is bonded in accordance with the present invention with the aft, peripheral surface 24' of the faceplate 24. As shown in the figure, a first base frit layer 84 is positioned over the forward edge 46" of the shadow mask support structure 46 and extends byond the corners thereof in an overlapping manner. Similarly, a second base frit layer 86 is positioned on the aft, periheral edge 24" of the faceplate 24 and extends beyond and around the 90° edge of the faceplate. Finally, an intermediate frit layer 88 is disposed upon the second base frit layer 86. The funnel 32, shadow mask support structure 46, and faceplate 24 are then assembly fixtured and exposed to high temperature to allow the frit bonds to form therebetween. Again, it is important that the intermediate frit layers 88 and 98 remain isolated from the two facing surfaces of the glass structures to be joined because of the frit's high surface tension which gives rise to its lack of wetting affinity for the glass.

There has thus been shown an important arrangement for securely bonding a CRT funnel or shadow mask support structure to the faceplate of the CRT in a sealed manner using a frit-based material. Two glass or ceramic CRT components may be coupled in a sealed manner in accordance with the present invention by applying respective base layers of the frit cement to the abutting surfaces of the two CRT components and then applying an intermediate layer of frit cement to one or both of the base layers prior to mating of the respective abutting surfaces to be bonded together. While the present invention has been described in terms of bonding two glass or ceramic structures in a CRT, it is not limited to the bonding of such materials but may also be used in metal-to-metal bonding or in bonding a metal structure to a glass or ceramic structure in a CRT. In addition, the present invention is not limited to the use of the frit cement as a priming agent but will work equally as well with other glass or ceramic priming agents. Finally, in some situations such as where the frit sealing cement exhibits a high degree of adherence to one of the bonded surfaces the present invention contemplates priming of only the other surface by a suitable priming agent in forming a sealed bond in accordance with the present invention.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In the manufacture of color cathode ray tubes, a method of joining two components composed of glass, ceramic, metal or other material amenable to being bonded together by the use of frit-based or other vitreous cement characterized by having a high cohesiveness and low propensity for wetting said components to be joined such that re-entrancies may be formed in the joint which tend to weaken the joint when subjected to loading, said method comprising:

providing a first component having a predetermined first sealing area and a second component having a predetermined second sealing area adapted to mate with said first sealing area;

applying to at least one of said sealing areas a viscous layer of cement comprised of a frit-based or other vitreous material characterized by having properties of high cohesion and low propensity for wetting said components; and mating said components along said sealing areas and baking the assembled combination to harden said cement, said method being characterized by including the step prior to said applying of said cement of applying a viscous priming layer of said same vitreous cement on at least one of said sealing areas which is composed of a material to which said cement has a high wetting affinity, the terminations of said viscous priming layer being caused to lie in regions of low stress outside the joint, whereby the resultant joint has a substantially reduced or non-existent tendency to form re-entrant seals in the component interface area where stresses when the joint is loaded may be high, thereby markedly reducing joint failures due to stress concentrations in the joint region, and whereby any stress concentrations resulting from re-entrancies formed at said terminations of said viscous priming layer, being in regions of low stress, are relatively harmless.

2. A method of frit-sealing the funnel and the faceplate of a cathode ray tube, comprising:

providing a glass funnel having a predetermined sealing area and a glass faceplate having a predetermined sealing area adapted to mate with said funnel sealing area;

applying to at least one of said sealing areas a viscous bead of cement comprised of a frit-based material characterized by having properties of high cohesion and poor wetting of glass; and mating said faceplate and funnel sealing areas and baking the assembled combination to harden said cement, said method being characterized by including the step prior to said applying of said cement of applying a viscous priming layer of said same frit-based cement on at least one of said sealing areas composed of a material to which said frit cement has a high wetting affinity, the terminations of said viscous priming layer being caused to lie in regions of low stress outside the faceplate-funnel interface, whereby the resultant faceplate-funnel joint has a substantially reduced or non-existent tendency to form re-entrant seals in the faceplate-funnel interface where stresses are high, thereby markedly reducing joint failures due to stress concentrations in the joint region, and whereby any stress concentrations resulting from re-entrancies formed at said terminations of said viscous priming layer, being in regions of low stress, are relatively harmless.

3. The method defined by claim 2 wherein said applying comprises dipping at least one of the sealing areas and marginal adjoining surfaces of said funnel and said faceplate in said priming material.

4. A method of frit-sealing the funnel and the faceplate of a cathode ray tube, comprising:

providing a glass funnel having a predetermined sealing area and a glass faceplate having a predetermined sealing area adapted to mate with said funnel sealing area;

applying to at least one of said sealing areas a viscous bead of cement comprised of a frit-based material characterized by having properties of high cohesion and poor wetting of glass; and mating said faceplate and funnel sealing areas and baking the assembled combination to harden said cement, said method being characterized by including the step prior to said applying of said cement of applying a viscous priming layer of said same frit-based cement on at least one of said sealing areas composed of a material to which said frit cement has a high wetting affinity, the terminations of said viscous priming layer being caused to lie in regions of low stress outside the faceplate-funnel interface, whereby the resultant faceplate-funnel joint has a substantially reduced or non-existent tendency to form re-entrant seals in the faceplate-funnel interface where stresses are high, thereby markedly reducing joint failures due to stress concentrations in the joint region, and whereby any stress concentrations resulting from re-entrancies formed at said terminations of said viscous priming layer, being in regions of low stress, are relatively harmless, wherein said applying comprises rolling said priming material on at least one of the sealing areas of said funnel and said faceplate.

5. A method of frit-sealing the funnel and the faceplate of a cathode ray tube, comprising:

providing a glass funnel having a predetermined sealing area and a glass faceplate having a predetermined sealing area adapted to mate with said funnel sealing area;

applying to at least one of said sealing areas a viscous bead of cement comprised of a frit-based material characterized by having properties of high cohesion and poor wetting of glass; and mating said faceplate and funnel sealing areas and baking the assembled combinations to harden said cement, said method being characterized by including the step prior to said applying of said cement of applying a viscous priming layer of said same frit-based cement on at least one of said sealing areas composed of a material to which said frit cement has a high wetting affinity, the terminations of said viscous priming layer being caused to lie in regions of low stress outside the faceplate-funnel interface, whereby the resultant faceplate-funnel joint has a substantially reduced or non-existent tendency to form re-entrant seals in the faceplate-funnel interface where stresses are high, thereby markedly reducing joint failures due to stress concentrations in the joint region, and whereby any stress concentrations resulting from re-entrancies formed at said terminations of said viscous priming layer, being in regions of low stress, are relatively harmless, wherein said applying comprises silk screening said priming material on at least one of the sealing areas of said funnel and said faceplate.

6. A cathode ray tube funnel-faceplate assembly produced by the method of claims 2, 3, 4 or 5.

7. A method of producing an improved frit-seal between the funnel and the flat faceplate of a tension-mask-type color cathode ray tube which seals tend to be more susceptible to failure than cathode ray tubes having a curvilinear faceplate due to the unusually high stresses created at the funnel-faceplate joint of such flat-faceplate tubes, said method comprising:

providing a glass funnel having a predetermined sealing area and a flat glass faceplate having a predetermined sealing area adapted to mate with said funnel sealing area;

applying to said sealing areas a viscous bead of cement comprised of a frit-based material characterized by having properties of high cohesion and poor wetting of glass; and mating said faceplate and funnel sealing areas and baking the assembled combination to harden said cement, said method being characterized by including the step prior to said applying said cement of applying a priming layer on at least one of said sealing areas composed of a material to which said frit cement has a high wetting affinity, the terminations of said priming layer being caused to lie in regions of low stress outside the faceplat-funnel interface, whereby the resultant faceplate-funnel joint has a substantially reduced or non-existent tendency to form re-entrant seals in the faceplate-funnel interface where stresses are high, thereby markedly reducing joint failures due to stress concentratoions in the joint region, and whereby any stress concentrations resulting from re-entrancies formed at said terminations of said layer, being in regions of low stress, are relatively harmless.

8. The method defined by claim 7 wherein said applying comprises dipping at least one of the sealing areas and marginal adjoining surfaces of said funnel and said faceplate in said priming material.

9. The method of claim 7 wherein said applying comprises rolling said priming material on at least one of the sealing areas of said funnel and said faceplate.

10. The method defined by claim 7 wherein said applying comprises silk screening said priming material on at least one of the sealing areas of said funnel and said faceplate.

11. A cathode ray tube funnel-faceplate assembly produced by the method of claims 7, 8, 9 or 10.

12. A method of frit-sealing the funnel and the faceplate of a cathode ray tube, comprising:

providing a glass funnel having a first sealing area and a glass faceplate having a second sealing area adapted to mate with said funnel sealing area;

applying a first layer of frit-based sealing glass to said first sealing area and a second layer of said frit-based sealing glass to said second sealing area in a manner such that said frit-based sealing glass layers extend beyond said sealing areas, wherein said frit-based sealing glass is characterized as having properties of high cohesion and poor wetting of glass;

applying an intermediate layer of said frit-based sealing glass to said first or said second layer of said frit-based sealing glass; and mating said respective first and second sealing areas of said funnel and said faceplate and baking the assembled combination to harden said frit-based sealing glass, wherein the terminations of said intermediate layer of said frit-based sealing glass lie in regions of low stress outside the faceplate-funnel interface, whereby the resultant faceplate-funnel joint has a substantially reduced or non-existent tendency to form re-entrant seals in the faceplate-funnel interface where stresses are high, thereby markedly reducing joint failures due to stress concentrations in the joint region, and whereby any stress concentrations resulting from re-entrancies formed at said terminations of said layer, being in regions of low stress, are relatively harmless.

13. The method defined by claim 12, wherein the steps of applying said first and second layers of frit-based sealing glass respectively comprise dipping the first sealing area and a marginal adjoining surface thereto of said funnel and the second sealing area and marginal adjoining surface thereto of said faceplate in said frit-based sealing glass.

14. The method of claim 12 wherein the steps of applying said first and second layers of frit-based sealing glass respectively comprise rolling said frit-based sealing glass on respective first and second sealing areas of said funnel and said faceplate as well as on respective surface portions of said funnel and faceplate immediately adjacent to said sealing areas.

15. The method defined by claim 12 wherein the steps of applying said first and second layers of frit-based sealing glass respectively comprise silk screening said frit-based sealing glass on the first sealing area and a marginal adjoining surface thereto of said funnel and on the second ealing area and marginal adjoining surface thereto of said faceplate.

16. A method of frit-sealing the shadow mask support structure and the faceplate of a cathode ray tube, comprising:
providing a ceramic shadow mask support structure having a first sealing area and a glass faceplate having a second sealing area adapted to mate with said support structure sealing area;
applying a first priming layer of frit-based sealing glass to said first sealing area and a second priming layer of said frit-based sealing glass to said second sealing area in a manner such that said frit-based sealing glass priming layers extend beyond said sealing areas, wherein said frit-based sealing glass is characterized as having properties of high cohesion and poor wetting of glass and ceramic;
applying an intermediate layer of said frit-based sealing glass to said first or said second layer of said frit-based sealing glass; and
mating said respective first and second sealing areas of said support structure and said faceplate and baking the assembled combination to harden said frit-based sealing glass, wherein the terminations of said priming layers lie in regions of low stress outside the shadow mask support structure-faceplate interface, whereby the resultant shadow mask support structure-faceplate joint has a substantially reduced or non-existent tendency to form re-entrant seals in the shadow mask support structure-faceplate interface where stresses are high, thereby markedly reducing joint failures due to stress concentrations in the joint region, and whereby any stress concentrations resulting from re-entrancies formed at said terminations and said priming layers, being in regions of low stress, are relatively harmless.

17. The method defined by claim 16 wherein the steps of applying said first and second layers of frit-based sealing glass respectively comprise dipping the first sealing area and a marginal adjoining surface thereto of said support structure and the second sealing area and marginal adjoining surface thereto of said faceplate in said frit-based sealing glass.

18. The method of claim 16 wherein the steps of applying said first and second layers of frit-based sealing glass respectively comprise rolling said frit-based sealing glass on respective first and second sealing areas of said support structure and said faceplate as well as on respective surface portions of said support structure and faceplate immediately adjacent to said sealing areas.

19. The method of claim 16 wherein the steps of applying said first and second layers of frit-based sealing glass respectively comprise silk screening said frit-based sealing glass on respective first and second sealing areas of said support structure and said faceplate as well as on respective surface portions of said support structure and faceplate immediately adjacent to said sealing areas.

* * * * *